March 26, 1963  W. E. HEFNER  3,083,005
CLAMPING STRAP AND ADJUSTABLE CLAMPING BLOCK COMBINATION
Filed Sept. 13, 1961
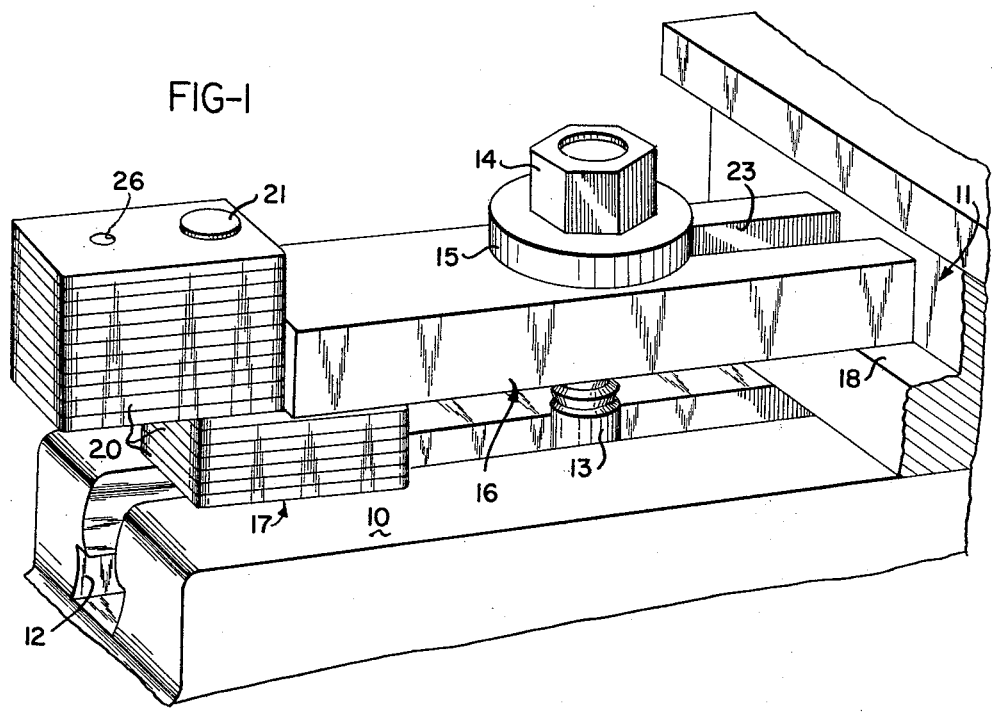
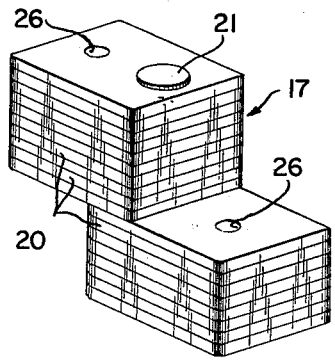
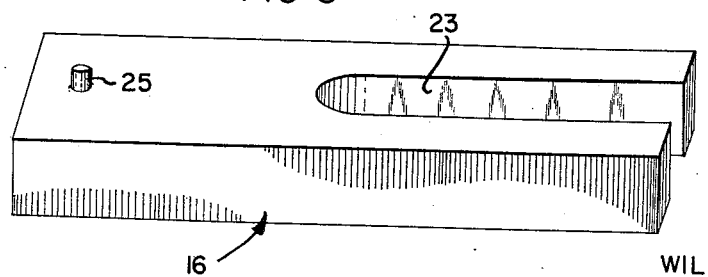
INVENTOR.
WILLIAM E. HEFNER
BY
Williams, Tilbury & Gobrick
ATTORNEYS

United States Patent Office 3,083,005
Patented Mar. 26, 1963

3,083,005
CLAMPING STRAP AND ADJUSTABLE CLAMPING BLOCK COMBINATION
William E. Hefner, 3120 Payne Ave., Cleveland 14, Ohio
Filed Sept. 13, 1961, Ser. No. 137,897
4 Claims. (Cl. 269—91)

The present invention is concerned generally with an improved combination of a clamping strap and clamping block, and more particularly with an improved clamping strap and adjustable clamping block combination providing a mechanical interlock between the primary elements thereof which prevent the clamping block from working out from under the strap during periods of relatively extended use.

In the machine tools arts and practice, work pieces, die blocks, jigs, or other auxiliary tooling equipment are commonly secured on the bed, table or other working area of a machine by a clamping strap, a metal bar or the like having one end bearing on the object to be clamped, the other end bearing on a clamping block preferably with the bearing surface of the block and object practically at the same height, and with clamping pressure or force applied through the strap by a bolt engaged in the object supporting the surface of the machine and with the block. Thus for example a bolt passed through the strap and an interposed washer may be threadedly engaged in tapped hole in the bed so that it may be screwed down to tighten the strap on block and object; or quite commonly a T-headed bolt with head engaged in a T-slot of the bed extends through the clamping strap with a washer and nut applied to the free end to be tightened down and derive the clamping force.

In the prior art various types of clamping blocks and straps have been used. Thus to provide a bearing surface for the strap there have been used, for example, simple blocks of appropriate thickness; stepped blocks or other blocks providing surfaces at diverse levels selectable by appropriate orientation of the block; stacked plate blocks comprised of a set of plates pivotally held together by a bolt, rivet or other appropriate means passed through the plates near one end, whereby a certain number of plates could be turned out of position to reach an undisplaced plate of appropriate height.

However, all the cooperating combinations of strap and block apparently have had no positive mechanical engagement or interlock between strap and block of a character to prevent movement of the block from under the strap. Movement of the block from under the strap has thus been prevented only by those frictional forces between the block and bed and between block and strap developed by the relatively high clamping forces or pressures applied through the strap to the block and in turn to the bed. However, where the object being clamped, or even the machine as a whole is subject to repeated vibration, as in a stamping press where a die block is clamped in position on the machine, it has often happened that despite the clamping forces the block has gradually worked its way out from under the strap, requiring at least a restoration of the block and clamping setup, perhaps the entire clamping setup with usually two or more strap-block combinations, and at worst involving equipment breakage and material loss.

By the present invention a relatively simple expedient completely obviates this problem, namely by providing an interlocking engagement between the block element and the strap element in the combination. This is simply attained by providing on the mating or mutually bearing faces an aperture or other recess in one element adapted to receive a lug or projection on the other element.

In a preferred form or embodiment of the invention the combination comprises a strap having a round pin projecting from that portion fo the strap intended to bear on the block, which pin is received in a corresponding aperture in the strap supporting surface of the block. The block here comprises a stack of plates of identical form held together in hinged or pivoted relation by a stud, rivet or other fastening means passed down through aligned apertures provided at one end of each of the respective plates, with each plate having a second aperture toward the other end adapted to receive said pin when the plate is used as the selected surface available in the block for strap support.

The general object of the present invention is then to provide an improved combination of a cooperating clamping block and clamp strap for the purposes described. Another object is the provision of a combination of cooperating clamp strap and clamp block having simple interlocking means to prevent a block from working out from under a clamping strap when in use on a machine. A still further object is the provision of an adjustable clamping block and clamp strap combination wherein means are provided for interlocking block and strap under every adjusted condition of the block. Other objects and advantages of the present invention will appear from the following description and the drawings wherein:

FIG. 1 is a perspective view illustrating the combination of a clamp block and a clamping strap according to the present invention disposed in a typical manner of use;

FIG. 2 shows in perspective a clamping block used in the combination; and

FIG. 3 shows in perspective a clamp strap inverted from its usual position of use.

In FIG. 1 of the drawings there are represented in fragmentary form the bed 10 of a machine, such as a drill-press, milling machine, punch press, or other machine whereon there is clamped an object 11 (also represented in fragmentary form) which may be, for example, a workpiece or a die block. The bed is provided with means engageable by a clamping bolt, such as a threaded hole into which the bolt is threaded, or as here shown a T-slot 12 receiving the T-head of bolt 13, whereby through nut 14 and interposed washer 15, the clamping strap 16 is secured with opposite ends bearing respectively on a surface of a clamping block 17 and of the clamped object 11, here a shoulder 18.

The clamping block 17 (see also FIG. 2) comprises a stack of rectangular plates 20 of known thickness held together in readily pivotal relation by a rivet 21 passed through similarly placed apertures near one end or margin of each plate, and having the bottom end, deformed or headed in the riveting, accommodated entirely within a bottom counter bore or recess about the corresponding aperture of the bottom plate which serves as a base. Means other than a rivet, of course, may be and have been used to retain the plates in pivotal stacked relation. This clamping block arrangement permits plates to be swung off the top of the stack to one side or as shown in FIG. 1 to the riveted end, until the height of the undisplaced plates equals or approximates as closely as practically possible the height of the surface 18 of the object to be clamped, thereby providing on the top of the first undisplaced plate a suitable bearing surface for one end of the clamp strap 16.

The clamp strap 16 (see also FIG. 3), of course, is of suitable material, usually steel, and cross-section for the clamping forces required, and has a formation such as a hole or, as shown, an open ended slot 23 to receive the bolt 13 therethrough.

The elements and methods of use thus far described are generally well known in the art. However, novel and improving features of the present invention appear most readily in FIGS. 2 and 3, where there may be seen on the bottom side of and located near one end of strap 16 a short projecting pin 25, and in the plates of clamping block 17, apertures 26 adapted in size and position to receive pin 25. The pin may be simply press-fitted into a short blind hole of the strap. Preferably the projecting length of the pin 25 is no greater than the thickness of the plates 20, or of the bottom or base plate where the individual plates are not of identical thickness, so that the pin will not bear on any bed surface which may underly the block.

With this arrangement, when the block and strap are brought into cooperative relation with the bottom pin-bearing end region of the strap bearing on the block as in FIG. 1, the pin 25 enters the aperture 26 of the uppermost plate supporting the strap, and mechanically locks the strap and block together. In consequence there is rendered impossible any working of the block out from under the strap as at times occurs, for example, where a die block is clamped in a high rate stamping machine or press when only the frictional forces between block and bed and block and strap arising under clamping pressures are present to prevent movement.

In simplest form for production and use, the plates 20 are identical in shape, thickness and location of rivet apertures and apertures 26, so that the plates may be mass produced by one stamping operation per plate in which two round holes are punched and the plate is sheared out of sheet stock.

The location of the apertures 26 and pin 25 are of course selected so that there will be no interference between the end of the strap and the turned or un-used plates.

I claim:

1. In the combination of a clamping block element and a clamp strap element, said strap element being adapted to bear upon an object to be clamped to the bed of a machine and bearing upon a surface of said block element supported on bed of the machine and secured by bolt means extending through the strap at a region between block and object and engaged with the bed of the machine, that improvement comprising: interlocking means between mutual bearing surfaces of said block and said strap, one of said elements having a recess opening at its said contact surface and the other said element having a pin projecting from its respective contact surface adapted to be engaged in said recess to provide said interlocking means.

2. The combination of a clamping strap with a clamping block providing surfaces of selective height to support a portion of said strap bearing thereon comprising: said strap having in said portion a projecting pin; said clamping block comprising a stack of plates having therethrough aligned perforations each located toward one margin of a respective plate and fastening means passed through the perforations retaining the plates in a grouped unit and permitting plates to be pivotally displaced relative to those beneath to expose a portion of a plate of selected height adapted to provide a bearing surface for said clamp strap; each of said plates having a second aperture or perforation adapted to receive said pin when the respective plate is used to provide said bearing surface.

3. The combination as described in claim 2 wherein said plates are of substantially identical plan form.

4. The combination as described in claim 2 where the plates are of substantially rectangular form with the fastener receiving apertures located near one end and the pin receiving apertures near the other.

References Cited in the file of this patent

UNITED STATES PATENTS

| | | |
|---|---|---|
| 1,623,689 | Lind | Apr. 5, 1927 |
| 1,815,414 | Lord | July 21, 1931 |
| 2,541,605 | Ohlsson | Feb. 13, 1951 |
| 2,783,963 | Kalberg | Mar. 5, 1957 |